United States Patent [19]

van Blerk

[11] Patent Number: 4,839,752

[45] Date of Patent: Jun. 13, 1989

[54] TEMPERATURE/HUMIDITY FLOPPY DISK CASSETTE DEFEAT MECHANISM

[75] Inventor: Victor B. van Blerk, San Jose, Calif.

[73] Assignee: Verbatim Corporation, Sunnyvale, Calif.

[21] Appl. No.: 123,458

[22] Filed: Nov. 19, 1987

[51] Int. Cl.$^4$ .................. G11B 15/18; G11B 17/00
[52] U.S. Cl. .................................. 360/69; 360/60
[58] Field of Search ............... 360/60, 69; 116/217; 73/337

[56] References Cited

U.S. PATENT DOCUMENTS 2,446,361  8/1948  Clibbon .
4,119,195  10/1978  Widoner .
4,457,430  7/1984  Darling .
4,488,646  12/1984  McCorkle .
4,539,929  9/1985  Sestak .

Primary Examiner—A. J. Heinz
Attorney, Agent, or Firm—Dennis P. Monteith

[57] ABSTRACT

A defeat mechanism serves to prevent a floppy disk cassette from being operatively loaded into a drive mechanism when the cassette has been subjected to either a high-moisture or a high-temperature condition—either environment being potentially harmful to the recording capability of a floppy disk. The defeat mechanism includes a wax which melts in a high-temperature environment and a hygroscopic salt which breaks down in a high-moisture condition. If either the wax or the salt changes from a solid form, a control element of the defeat mechanism automatically moves into an actuated position which prevents the operative loading of the cassette.

11 Claims, 3 Drawing Sheets

TEMPERATURE/HUMIDITY FLOPPY DISK CASSETTE DEFEAT MECHANISM

CROSS-REFERENCE TO A RELATED APPLICATION

Reference is hereby made to U.S. patent application Ser. No. 122,143, entitled TEMPERATURE/HUMIDITY INDICATOR FOR A FLOPPY DISK CASSETTE.

BACKGROUND OF THE INVENTION

1. Field of the Invention

The present invention relates to apparatus for monitoring the environment of a floppy disk. More particularly, the invention relates to a defeat mechanism which prevents the use of a floppy disk cassette when it has been subjected to a potentially harmful high-temperature and/or high-humidity condition.

2. Description Relative To The Prior Art

A magnetic floppy disk will normally function properly over a relatively wide range of humidity and temperature conditions. When exposed to an excessively high temperature over a period of time, however, a magnetic oxide and a binder of the disk have a tendency to separate resulting in media failure or in extreme cases depositing binder on a magnetic head resulting in signal failure; high humidity likewise tends to accentuate both head and disk wear.

Ideally, each use of a disk would be at room temperature and relative humidity in a range near fifth percent. Unfortunately, this is not always feasible, so the limitations of the magnetic media must be considered and either adhered to or compensated for through increased cost such as by customizing the design of a disk drive mechanism.

The small size of a 3.5-inch floppy disk cassette makes it very portable. The ease with which a "micro" cassette can be transported potentially exposes the floppy disk to even more hostile environments including extreme moisture and temperature which can destroy existing data or make a disk system incapable of properly recording.

SUMMARY OF THE INVENTION

The present invention recognizes that exposure of a floppy disk to an extreme environmental condition can cause media failure. An object of the invention therefore is to provide a floppy disk cassette with a defeat mechanism which prevents the operative loading of the cassette into a drive mechanism if the disk has been exposed to either an extremely high-moisture or a high-temperature condition. When the defeat mechanism signals an adverse environmental condition, it is then time to copy the disk. This can be done by temporarily overriding the defeat mechanism, to permit the copying of the disk before a system failure and/or data loss occurs.

The object of the invention is accomplished by providing a disk cassette with a control element mounted for movement between two positions -- a normal position in which the cassette is suitable for being operatively loaded into a drive mechanism, and an actuated position in which the control element prevents the cassette from being loaded into the drive mechanism. An environmentally sensitive mechanism controls which one of the two positions the control element is in depending on whether or not the cassette has been subjected to a potentially harmful environment.

In a presently preferred embodiment, the environmentally sensitive mechanism comprises a wax and a hygroscopic salt; the wax melts at high temperature and the salt breaks down in a high-humidity condition. If a change of state of either were to occur, a spring-biased member, normally held in a tensioned position when both the wax and salt are in solid form, resiliently bias the control element into its actuated position. Preferably the wax and the salt are contained within a leak-proof chamber to protect the disk from liquid wax or the salt if it breaks down.

An advantage of the invention is that a user is forewarned that the floppy diskette has been exposed to an environment which may eventually result in loss of data or be harmful to the overall system -- drive mechanism and media. This advantage of the invention, as well as other advantages, will become more apparent in the detailed description of preferred embodiments presented below.

DESCRIPTION OF THE DRAWINGS

The invention will be described with reference to the accompanying drawings, wherein.

DETAILED DESCRIPTION OF PREFERRED EMBODIMENTS

Figure 1:
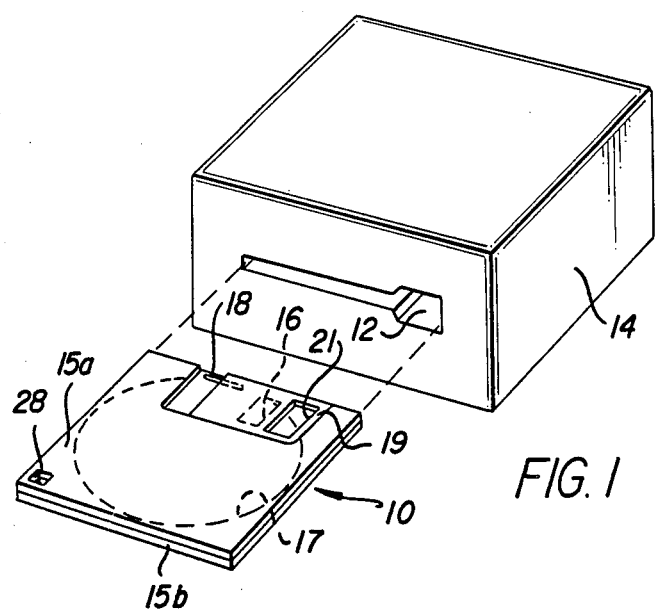
FIG. 1 is a perspective view of a floppy disk cassette and a drive mechanism.

FIG. 1 is a perspective view of a floppy disk cassette 10 aligned with a front-loading slot 12 of a disk drive mechanism 14. A jacket assembly of the cassette includes a pair of peripherally abutting housing halves—a top half 15a and a bottom half 15b (as viewed in FIG. 1)—of a generally square-perimeter configuration surrounding an elongated head-across opening 16. The housing havles 15a 15b, which are comprised of a preformed rigid plastic material such as for example injection molded ABS resin or the like, are preferably held together along their peripheral edges by means of ultrasonic welding or the like to form a protective shell having an internal compartment generally enclosing a flexible or so-called floppy disk 17. An elongated guide groove 18, parallel with the front edge of each housing half (again as shown in FIG. 1), serves as a track for a spring-biased slidably mounted shutter 19 which normally covers the head-across opening 16 to keep dirt, dust, etc. away from the disk 17.

Figure 2:
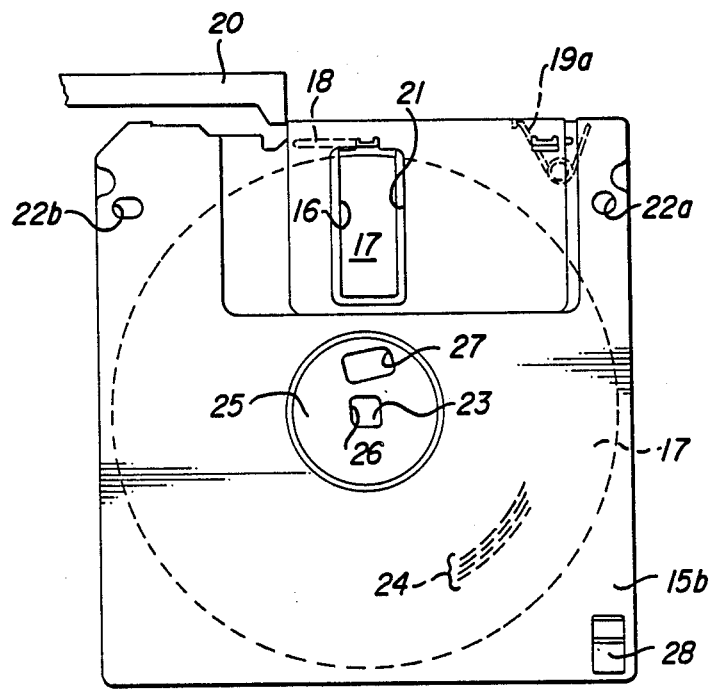
FIG. 2 is a bottom planar view of a floppy disk cassette.

FIG. 2 shows a bottom plan view of the floppy disk cassette 10 with the shutter 19 in a disk-uncovering position. To reach that position, a pivotally mounted lever arm 20 of the drive mechanism 14 engages the left-hand edge of the shutter 19 (as viewed in FIG. 2) when the cassette 10 is inserted initially into the loading slot 12 of the drive mechanism. The lever arm 20, in response to the cassette 10 moving towards its destination disk-drive position, pivots in the counterclockwise direction, thereby urging the shutter from its disk-covering position (FIG. 1) to its disk-uncovering position against the influence of a shutter bias spring 19a. In its disk-uncovering position, an elongated aperture 21 of the shutter 19 overlaps the head-across opening 16 to expose the disk 17.

A circular locating hole 22a and an oval hole 22b, on opposite sides of the bottom half 15b of the cassette 10, function cooperatively with disk drive alignment pins to precisely position the cassette 10 so that the disk 17 is located in a predetermined operative plane; this permits a radially movable magnetic transducer head of the drive mechanism to properly engage the recording surface of the disk 17 through the head-access opening 16.

The drive mechanism serves to cooperatively move the magnetic head radially while rotating the disk 17 about a central axis to permit the head to record and/or play back data from generally equally spaced record tracks 24 encircling the rotational axis of the disk. To that end, a centrally disposed circular member 25 functions as a drive hub for the disk 17. For that purpose, the member 25 includes an on-axis generally square aperture 26 for receiving a disk alignment pin and an off-axis generally rectangular aperture 27 for inserting a disk drive shaft. A write protection device 28 is located near a corner of the cassette where it does not interfere with the disk 14.

To this point the elements of the cassette 10 that have been described are conventional and are well known in the art. The cassette 10, however, unlike the prior art includes a defeat mechanism which prevents operative loading of the cassette 10 into a drive mechanism if the disk has been exposed to either a high temperature or a high humidity --either condition being potentially harmful to the disk 17 from the standpoint of accurately recording or playing back data. The term "operative loading" as used herein shall mean and refer to the proper positioning of a floppy disk cassette in a drive mechanism, including the conditioning of the cassette, such as by opening its shutter, to permit a magnetic head of the drive mechanism to write onto or read information from the recording surface of the disk.

Figure 3A:
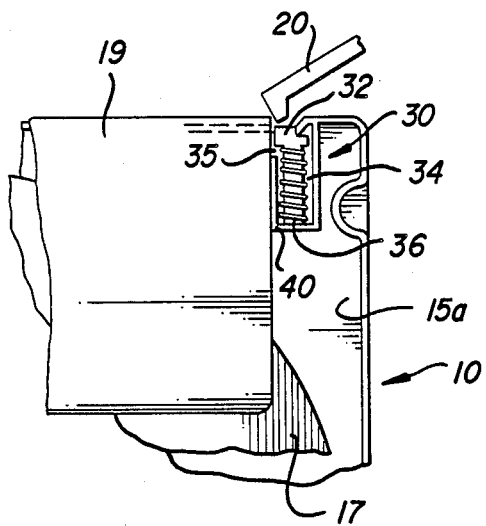
FIGS. 3A and 3B are planar views of a presently preferred embodiment of a temperature-sensitive and-/or humidity-sensitive defeat mechanism, in accordance with the invention, located internally in a front corner of the cassette.
Figure 3B:
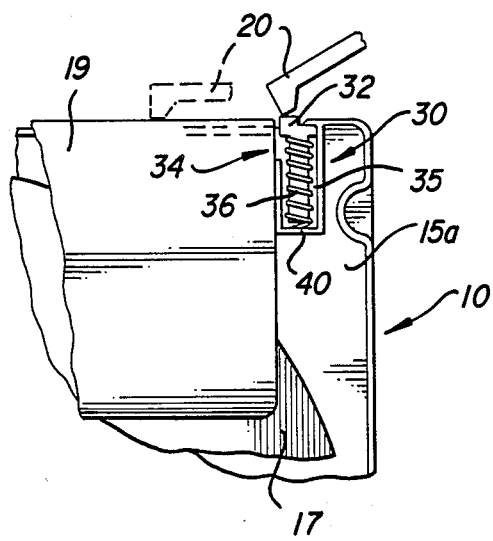

FIGS. 3A and 3B illustrate an inside front cover of the top half 15a of the cassette 10 (the bottom half 15b of the protective shell is removed) to show a defeat mechanism 30 in accordance with a presently preferred embodiment of the invention. The defeat mechanism 30 includes a control element 32 which serves to prevent the cassette 10 from being operatively loaded into a drive mechanism when a potentially adverse high-temperature or high-humidity condition has been sensed. To that end, the control element 32 is mounted for movement between a normal internal position (FIG. 3A), and an actuated position (FIG. 3B), extending external to the cassette 10 slightly beyond its front peripheral wall.

The defeat mechanism 30 further includes an environmentally sensitive mechanism 34 which serves to control the position of the element 32 as a function of whether the cassette 10 (hence the disk 17) has been exposed to the aforementioned high-temperature and/or high-humidity condition. To that end, the mechanism 34 includes a composite material 35 comprising (1) a wax, which melts when subjected to a temperature above a predetermined level, and (2) a hygroscopic salt, which breaks down—changes from a solid state to a liquid or at least a partially dissolved state—when exposed to an environment having a humidity condition in excess of a given percentage.

A helical spring 36 of the mechanism 34, attached to the control element 32, serves to actually move the control element to its external actuated position. The spring 36 normally is held or latched in a tensioned position so long as both the wax and the hygroscopic salt remain in a solid form. For that purpose, the spring 36 is preferably embedded in the composite material 35. When either component of the material 35 changes to a modified state—the wax melts or the salt dissolves—the spring 36 is released, and thereby drives the control element 32 into its actuated position external to the front peripheral wall of the cassette 10.

Assuming that the disk 17 has been exposed to either a high-temperature or a high-humidity condition, the control element 32 assumes its actuated external position (FIG. 3B). (This, of course, in itself serves as a signal to a cassette user that the disk has been subjected to a potentially adverse environmental condition). If a user inserts the cassette 10 into the loading slot 12 of the drive mechanism 14 with the control element 32 actuated, the lever arm 20 pivots slightly in the clockwise direction, as viewed in FIG. 3, in response to the control element. This initial clockwise movement swings the lever arm 20 slightly beyond the front edge of the shutter 19 (as viewed in FIG. 3B). The lever arm 20, in response to further cartridge-insertion movement, pivots and moves from right to left (again as viewed in FIG. 3B), and thereby merely rides across the front of the shutter 19, as shown by the dashed lines of FIG. 3B. When the cassette 10 reaches its destination position in the drive mechanism, the shutter 19, of course, still covers the head-access opening 16; thus the cassette 10 is prevented from being operatively loaded into the drive mechanism.

From the foregoing, it will be clear to those skilled in the art that the control element 32 may alternatively be positioned adjacent the front left-hand edge of the shutter 19. With this arrangement, the lever arm 20 would be permitted to engage the right-hand edge of the shutter 19, but the control element 32, when in its extended actuated position, would block disk-uncovering movement of the shutter 19 at its opposite left-hand edge. The shutter 19 thereby would be wedged between the control element 32 on the left and the lever arm 20 on the right; thus a user would be prevented from inserting the cassette fully into the drive mechanism.

Figure 4:
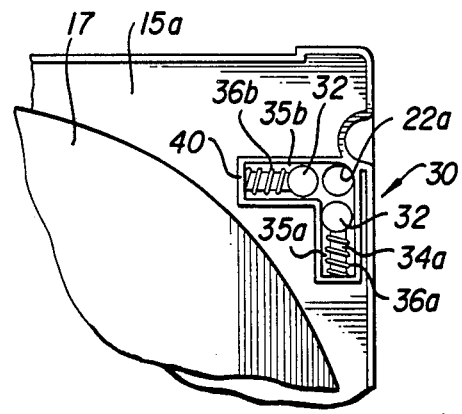
FIGS. 4, 5A, 5B, and 6 are planar views of alternate preferred embodiments of the defeat mechanism.

FIGS. 4, 5A and 5B, and 6 show alternate preferred embodiments of the defeat mechanism 30. In the embodiment of FIG. 4, the control element 32 serves to prevent the operative loading of the cassette 10 by means of covering or filling the circular locating hole 22a. This prevents the seating of the cassette 10 on the corresponding locating pin in the drive mechanism 14, and thereby secures the disk 17 against being properly positioned in its operative plane. The defeat mechanism 30 may also be arranged, of course, so that the control element 32 fits or covers the oval locating hole 22b.

The embodiment of FIG. 4 further provides that the environmentally sensitive mechanism 34 is comprised of two separate independent components -- one responsive to high temperature and the other responsive to high humidity. For that purpose, the material 35 is comprised of separate cylinders 35a and 35b—one of wax and the other of hygroscopic salt. The wax 35a tensions helical spring 36a and the salt 35b tensions corresponding spring 36b. If either the wax melts or the salt dissolves, a corresponding control element 32 moves under the influence of a similarly corresponding helical spring 36 to block the locating hole 22a.

Figure 5A:
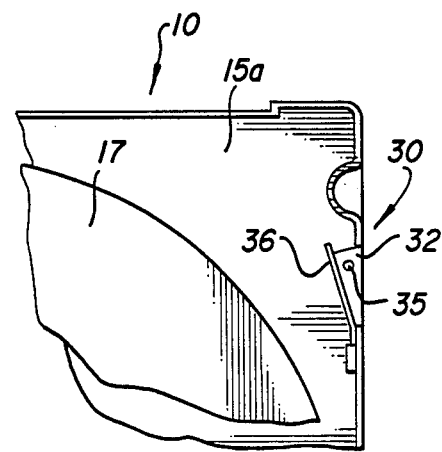
Figure 5B:
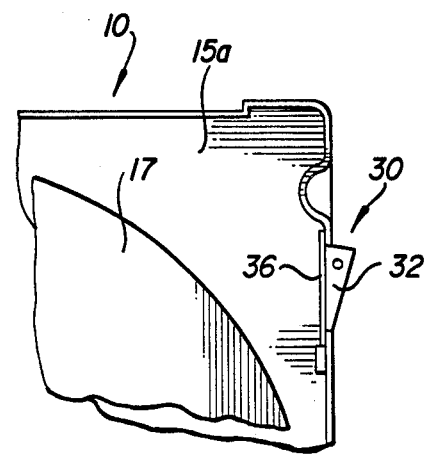

In the embodiment of FIGS. 5A and 5B, the control element 32 is in the form of a pie-shaped member resiliently biased by a finger-like spring 36 attached at one end to the inside surface of a side peripheral wall of the cassette 10. The control element 32 is latched in its normal internal position (FIG. 5A), against the influence of the spring 36, by means of the composite material 35 which is in the form of a pin attached securely to the inside of the top half 15a of the cassette 10. When either the wax melts or the salt dissolves, the force of the spring 36 overcomes the latching force of the composite material 35 and thereby drives the control element 32 to its actuated external position, slightly beyond the side wall of the cassette 10 (FIG. 5B). In that position, the element 32 blocks the cassette 10 from being inserted fully into the front-loading slot 12 (FIG. 1) of the drive mechanism 14.

Figure 6:
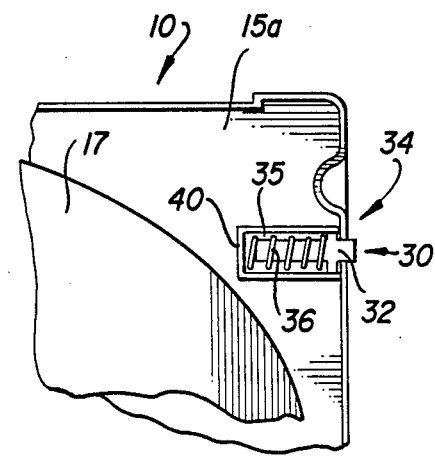

In the embodiment of FIG. 6, the environmentally sensitive mechanism 34 is substantially identical in structure to the embodiment of FIG. 5; in function, however, the mechanism 34 of FIG. 6, like the mechanism of FIG. 5, serves to prevent the cassette 10 from actually being inserted fully into a drive mechanism.

In the embodiments of FIGS. 3, 4 and 6, cassette 10 further includes a leak-proof chamber retaining the wax and the hygroscopic salt to protect the disk 17 when either changes from a solid to a liquid state. An enclosed structure 40 serves as walls for the chamber. To that end, the structure 40, which is formed conveniently during the injection molding operation of the plastic resin, is integral with the jacket assembly of the cassette 10. The leak-proof chamber is enclosed when the two halves 15a, 15b of the jacket assembly are welded together.

ADVANTAGEOUS TECHNICAL EFFECT

From the foregoing it is apparent that there has been disclosed an improved floppy disk cassette having a defeat mechanism that operates automatically to prevent the use of the cassette when it has been exposed or subjected to an environment having either an extremely high moisture content or high temperature. When the defeat mechanism is actuated, it provides an immediate signal to a cassette user to copy the disk before media failure occurs. For that purpose, the defeat mechanism 30, once it has been actuated, can be disabled, preferably manually by removing the control member 32, to allow the cassette to be loaded into a drive mechanism a final time, for a copying operation.

What is claimed is:

1. For use with a drive mechanism, a cassette enclosing a rotatably mounted disk for recording data on and/or playing back data from a plurality of concentric record tracks on a recording surface thereof, a defeat mechanism for said cassette comprising:
   (a) a control element mounted for movement between (1) a first normal position in which said cassette is adaptable to being operatively loaded into a drive mechanism, and (2) a second actuated position external to said cassette in which said element prevents said cassette from being operatively loaded into the drive mechanism; and
   (b) a temperature-sensitive mechanism which retains said control element in its normal position so long as said cassette is not exposed to an environment having a temperature above a level that is harmful to the disk and which moves said element to its actuated position when said cassette is subjected to an environment having a temperature above the aforementioned level.

2. For use with a drive mechanism, a cassette enclosing a disk adapted for rotation under control of such drive mechanism which records data on and/or plays back data from concentric tracks on a recording surface of the disk, a defect mechanism for said cassette comprising:
   (a) a control element mounted for movement between (1) a first normal position in which said cassette is adaptable to being operatively loaded into a drive mechanism, and (2) a second actuated position in which said control element secures said cassette against being operatively loaded into the drive mechanism; and
   (b) a temperature-sensitive mechanism which controls which one of the two positions said control element is in depending on whether or not said cassette is subjected to an environment having a temperature above a predetermined level.

3. A cassette as defined in claim 2 wherein said temperature-sensitive mechanism includes a temperature-sensitive member which changes from a normal solid state to a liquid state when subjected to a temperature above a given level, and a resilient member which moves said control element from its normal position to its actuated position in response to said temperature-sensitive member assuming its liquid state.

4. A cassette as defined in claim 3 wherein said temperature-sensitive member is a wax.

5. For use with a drive mechanism, a cassette enclosing a rotatably mounted disk for recording data on and/or playing back data from concentric tracks on a recording surface of the disk, a defeat mechanism for said cassette comprising:
   (a) a control element mounted for movement between (1) a first normal position in which said cassette is suitable to being operatively loaded into a drive mechanism, and (2) a second actuated position in which said control element secures said cassette against being operatively loaded into the drive mechanism; and
   (b) an environmentally sensitive mechanism which changes from a first normal state to a second modified state under the influence of either a temperature condition or a humidity condition potentially adverse to the data-recording capability of the disk, said environmentally sensitive mechanism maintains said control element in its normal position so long as said environmentally sensitive mechanism is in its normal state and said environmentally sensitive mechanism causes said control element to move to its actuated position when said environmentally sensitive mechanism is in its modified state.

6. A cassette as defined in claim 5 including a shutter mounted for movement from a normal disk-covering position to an actuated disk-uncovering position in response to insertion of said cassette into the drive mechanism, wherein said control element prevents said shutter from moving from its disk-covering position when said control element is in its second external position.

7. A cassette as defined in claim 5 having positioning means for locating the disk in an operative plane when said cassette is operatively loaded into the drive mechanism, wherein said control element prevents said positioning means from locating the disk in its operative plane when said control element is in its second position.

8. A cassette as defined in claim 5 wherein at least a portion of said control element is external to said cassette when said control element is in its second position to prevent said cassette from being inserted into the drive mechanism.

9. For use with a drive mechanism, a cassette enclosing a rotatably mounted disk adapted for rotation under control of such drive mechanism which records data on and/or plays back data from a recording surface of the disk, a defeat mechanism for said cassette comprising:

(a) a control element mounted for movement between (1) a first position internal to said cassette wherein said cassette is suitable to being operatively loaded into a drive mechanism, and (2) a second external position in which said cassette is prevented from being operatively loaded into a drive mechanism; and (b) a humidity-sensitive mechanism which controls which one of the two positions said control element is in depending on whether or not said humidity-sensitive mechanism is subjected to an environment the humidity of which is above a predetermined level.

10. A cassette as defined in claim 9 wherein said humidity-sensitive mechanism includes a moisture-sensitive member which changes from a normal solid form to at least a partially dissolved form when subjected to an environment having a humidity above a given percentage, and a resilient member which moves said element from its normal position to its actuated position in response to said moisture-sensitive member assuming a partially dissolved form.

11. A cassette as defined in claim 10 wherein said moisture-sensitive member is a hygroscopic salt.

* * * * *

UNITED STATES PATENT OFFICE
CERTIFICATE OF CORRECTION

PATENT NO. : 4,839,752
DATED : June 13, 1989
INVENTOR(S) : Victor Bruce van Blerk It is certified that error appears in the above-identified patent and that said Letters Patent is hereby corrected as shown below:

Column 6, line 10         "defect" should read ---defeat---

Signed and Sealed this

Twentieth Day of March, 1990

Attest:

JEFFREY M. SAMUELS

Attesting Officer          Acting Commissioner of Patents and Trademarks